UNITED STATES PATENT OFFICE.

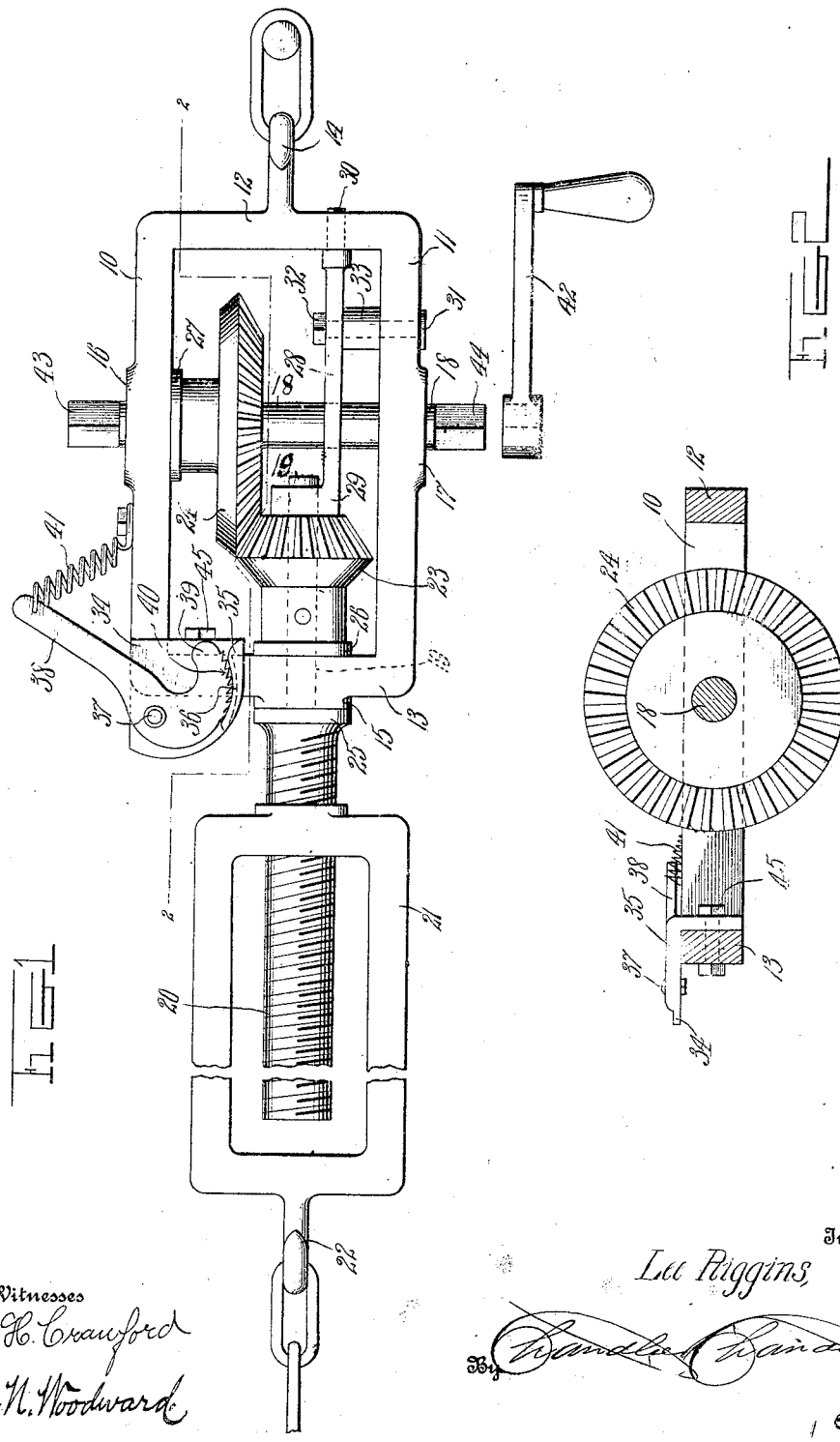

LEE RIGGINS, OF EVONA, KENTUCKY.

WIRE-STRETCHER.

No. 914,604.　　　　　Specification of Letters Patent.　　　Patented March 9, 1909.

Application filed December 4, 1908. Serial No. 466,030.

*To all whom it may concern:*

Be it known that I, LEE RIGGINS, a citizen of the United States, residing at Evona, in the county of Casey, State of Kentucky, have invented certain new and useful Improvements in Wire-Stretchers; and I do hereby declare the following to be a full, clear, and exact description of the invention, such as will enable others skilled in the art to which it appertains to make and use the same.

This invention relates to devices for stretching wire and more particularly to implements of this class employed for straining or stretching strand members of wire fences, and has for one of its objects to improve the construction and increase the efficiency and utility of devices of this character.

Another object of the invention is to provide a simply constructed device, whereby strand wires or fence panels may be strained and the strain retained while the device is being adjusted to a new point upon the member to be stretched, a step by step action being thus secured.

With these and other objects in view, the invention consists in certain novel features of construction, as hereinafter shown and described and then specifically pointed out in the claims, and in the drawings illustrative of the preferred embodiment of the invention, Figure 1 is a plan view of the improved device applied. Fig. 2 is a section on the line 2—2 of Fig. 1.

The improved device comprises in general, a rectangular main frame formed with spaced side members 10—11 and end members 12—13, the end member 12 having a hook 14 extending therefrom and the end member 13 provided with a transverse bearing 15. The side members 10—11 are provided, respectively, with transversely alined bearings 16—17.

Mounted for rotation through the bearings 16—17 is a main operating shaft 18, and mounted for rotation through the bearing 15 is another shaft 19, the latter shaft threaded as shown at 20 externally of the frame. The threaded portion 20 of the shaft 19 extends for a considerable distance beyond the frame, and engaging over this threaded portion is a straining device preferably formed of an elongated open frame 21 having a threaded aperture in one end to receive the threaded portion 20 of the shaft and with a hook 22 at the opposite end. By this arrangement, it will be obvious that when the shaft 19 is rotated, the member 21 will be moved longitudinally thereof.

Connected to the shaft 19 within the main frame is a bevel gear pinion 23, and connected to the shaft 18 also within the main frame is a bevel gear 24 engaging with the pinion 23, as shown.

The shaft 19 is provided with a stop shoulder or collar 25 external of the bearing 15 and likewise provided with a loose washer 26 between the hub of the pinion 23 and the bearing 15, while a smaller loose washer 27 is located upon the shaft 18 between the hub of the gear 24 and the frame member 10. By this means, the friction between the parts is materially reduced.

Located within the main frame, is an arm 28 having an intermediate bearing through which the shaft 18 extends and with a lateral offset 29 at one end through which the inner end of the shaft 19 extends, while the opposite end of the arm 28 extends through an aperture in the frame member 12, as shown at 30. The arm 28 is still further secured to the main frame by a clamp bolt 31 provided with a binding nut 32 and a spacer member 33. By this means, it will be obvious that the arm 28 is firmly secured in position and forms an efficient support for the inner end of the shaft 19. The arm 28 is rigidly secured to the main frame by the terminal 30 and the clamp bolt 31 with its nut 32, so that all danger of displacement is avoided and the shaft 19 retained in position and firmly held from displacement under the severe strains to which it will be subjected when in use.

Rigidly connected to the frame member 13 by a clamp bolt 45 is a plate 34 having a curved rib 35 extending therefrom, the rib having an inner concave face indicated at 36. Pivoted at 37 upon the plate 34 is a lever 38 having a cam face 39 at one end, the cam face having serrations 40 corresponding to and operating in the concave face of the rib 35. A spring 41 is connected between the free end of the lever 38 and the frame member 10 and operating to maintain the cam lever yieldably in operative position, and cause it to automatically grip the wire or other object arranged between the surfaces 35—40. The line of pull of the grip device, it will be noted, is substantially parallel to the longitudinal plane of the shaft 19 and also substantially in alinement with the line of movement of the straining device 21—22.

Means will be provided for engaging the hook 22 with the wire which is to be strained or stretched, and any suitable grip device may be employed for this purpose, but as this grip device does not form a part of the present invention, it is not illustrated.

In using the improved device, the hook 14 is connected in any suitable manner to a rigid or stationary support, such for instance, as a fence post, and the straining device 21 rotated to move it to the outer end of the screw portion 20 of the shaft 19 and the hook 22 connected in any suitable manner to the fence member to be strained. The shaft 18 is then rotated in any suitable manner, preferably by a crank 42 applied to one of the square ends 43 or 44 of the shaft to cause the gears 24—23 to rotate the shaft 19, and thus cause the straining device to operate. When the member 21 is moved to the inner end of the threaded portion 20, the terminal of the wire which is being strained is inserted in the grip device 35—38 and disconnected from the hook member 22 and the straining device 21 returned to the outer end of the threaded portion 20 and again connected to the wire to be strained, the grip device retaining the strain which has been secured until the straining device is in position to be again operated. By this means, it will be obvious that the straining of the wire is accomplished step by step, the grip device and the straining device thus coöperating to produce the desired result.

The improved device is simple in construction, can be very strongly and inexpensively manufactured, and applied for a variety of purposes, but as above noted, is more especially adapted for straining the longitudinal members of wire fences.

What is claimed is:—

1. A device of the class described, comprising a frame having a bearing in one end member and with a holding means carried by the other end and with transversely alined bearings in the side members, a shaft mounted for rotation through said transversely alined bearings, a shaft mounted for rotation through said end bearing with the portion of the shaft which extends beyond the frame threaded, a wire straining device having a threaded aperture and engaging said threaded shaft, interengaging gears carried by said shafts, an arm having an intermediate bearing through which said transverse shaft extends and with a lateral offset at one end provided with a bearing engaging the inner end of said threaded shaft and with the other end supported in said frame, and means for rigidly connecting said arm to said frame.

2. A device of the class described comprising a frame having a bearing in one end member and with a holding means carried by the other end and with transversely alined bearings in the side members, a shaft mounted for rotation through said transversely alined bearings, a shaft mounted for rotation through said end bearing with the portion of the shaft which extends beyond the frame threaded, a wire straining device having a threaded aperture and engaging said threaded shaft, interengaging gears carried by said shafts, a wire grip device carried by said frame substantially in alinement with the path of the wire straining device, an arm having an intermediate bearing through which said transverse shaft extends and with a lateral offset at one end provided with a bearing engaging the inner end of said threaded shaft and with the other end supported in said frame, and means for rigidly connecting said arm to said frame.

In testimony whereof, I affix my signature, in presence of two witnesses.

LEE RIGGINS.

Witnesses:
J. F. TARTER,
L. R. TARTER.